Nov. 7, 1961 W. ISLER 3,007,747
UNIVERSAL BEARING
Filed Feb. 18, 1960

INVENTOR.
WILLIAM ISLER
BY Isler & Ornstein
ATTORNEYS

United States Patent Office 3,007,747
Patented Nov. 7, 1961

3,007,747
UNIVERSAL BEARING
William Isler, 16100 Van Aken Blvd., Shaker
Heights, Ohio
Filed Feb. 18, 1960, Ser. No. 9,609
4 Claims. (Cl. 308—72)

This invention relates generally to bearings, but has reference more particularly to the type of universal bearing disclosed in the Reese Patent No. 2,654,643.

Although it has heretofore been proposed to provide a rod end connection, as in the Steele Patent No. 2,309,281, in which a bearing member is assembled with a cage or retaining ring by moving the bearing member through slots in the cage or retaining ring, and then rotating the bearing member 90 degrees to a position of coplanarity with the cage or retaining ring, such an arrangement or construction has not heretofore been used in the manufacture of two-piece universal bearings. Moreover, the provision of wide slots which are formed in both ends of the cage or retaining ring to permit entry of the bearing member is objectionable, not only because it leaves large areas of the bearing member as well as the coacting bearing surfaces exposed to the entry of dust, dirt and other foreign matter, but also materially reduces the effective coacting bearing areas of the parts, with consequent reduced efficiency of operation.

The present invention has, as its primary object, the provision of a universal bearing of the character described, in which the exposed area of the bearing member is reduced to a minimum, to avoid entry of dust, dirt and foreign matter.

Another object of the invention is to provide a universal bearing of the character described, in which the area of the coacting bearing surfaces is increased to a maximum, whereby the efficiency of operation of the bearing is improved to a great extent.

A further object of the invention is to provide a universal bearing of the character, which can be assembled much more easily than can the parts of the bearing disclosed in the aforesaid Reese patent.

In the accompanying drawings forming a part of this specification, and in which like numerals are employed to designate like parts throughout the same, FIG. 1 is a side elevational view of the inner bearing member of a universal bearing embodying the invention;

Figure 1:
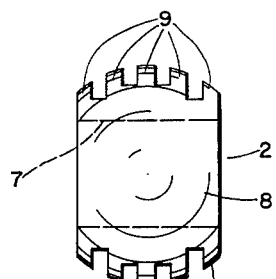
Figure 2:
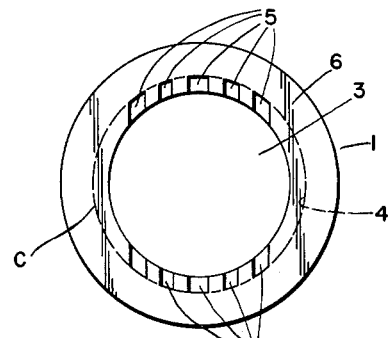
FIG. 2 is an end elevational view of one end of the annular cage or retaining member of the universal bearing.

Referring more particularly to the drawings, the bearing will be seen to comprise an annular cage or retaining member, generally designated by reference numeral 1, and an inner spheroidal bearing member, generally designated by reference numeral 2.

The member 1, while shown as of annular form, may be of other external form, but in any event is formed to fit tightly into a bore of a support (not shown) whereby the bearing is anchored.

The member 1 has an opening 3 therein, which is bounded by a spheroidal surface 4, which extends equidistantly in opposite directions from the equatorial plane A—A of the member 1, and preferably has a width of from about one fourth to about one third of the diameter of the surface 4.

The member 1 is provided at one end thereof, at diametrically-opposite sides of the opening 3, with sets of closely-spaced narrow parallel grooves 5, which extend from the end face 6 of the member 1 to the equatorial plane A—A and diminish in depth from a maximum at the end face 6 to zero at the equatorial plane A—A. The depth of the grooves 5 at the surface 6 is such that the bottoms of the grooves lie on a cylinder C which passes through the intersection of the surface 4 with the equatorial plane A—A.

Figure 5:
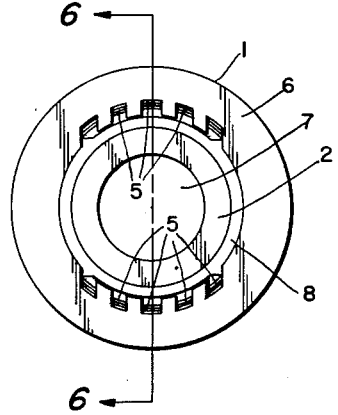
FIG. 5 is an end elevational view of the assembled bearing.
Figure 6:
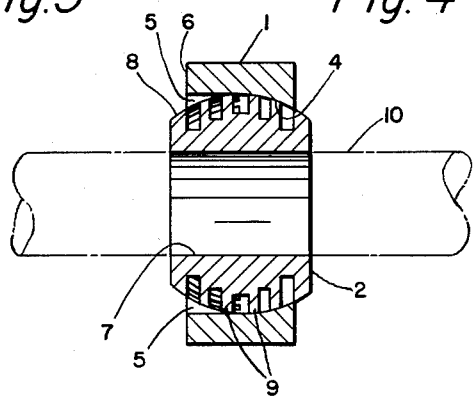
FIG. 6 is a cross-sectional view, taken on the line 6—6 of FIG. 5.

The bearing member 2 is also of spheroidal or spherical form and has an equatorial bore 7 therein. The member 2 has a spheroidal surface 8 which is complemental to and engageable with the surface 4 of the member 1 when the members 1 and 2 are disclosed as shown in FIG. 5 and 6.

The member 2 is provided at diametrically opposite sides of the spheroidal surface 8 with sets of parallel ribs 9, spaced to correspond with the spacing of the grooves 5 of the member 1, and extending tangentially of the surface 8. The ribs 9 lie in planes parallel with the general plane of the bearing member 2, and are adapted for entry into the grooves 5. They extend equidistantly in opposite directions from the diametral plane B—B of the member 2 and their depth from the surface 8 coincides with the depth of the grooves 5 from the surface 4, so that the ribs will nest closely in the grooves during assembly of the parts of the bearing.

Figure 3:
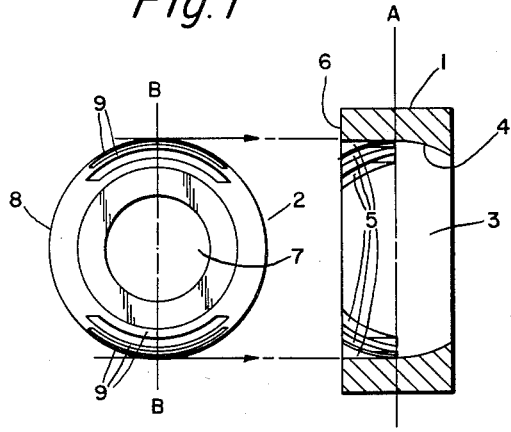
FIG. 3 is a view showing the first step in the assembly of the parts shown in FIGS. 1 and 2 to form the bearing.
Figure 4:
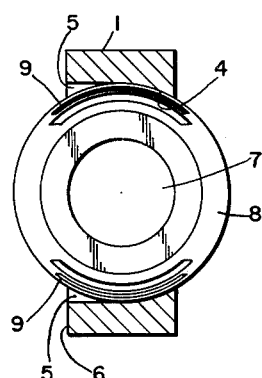
FIG. 4 is a view showing the second step in the assembly of the parts shown in FIGS. 1 and 2 to form the bearing.

In assembling the parts of the bearing, the bearing member 2 is disposed with its ends at right angles to the end face 6 of the cage or retaining ring 1, in the position shown in FIG. 3, wherein the ribs 9 are aligned with the grooves 5, after which the member 2 is moved through the grooves until it is in a position centrally within the member 2, as shown in FIG. 4. In this latter position, the ribs 9 are disengaged from the grooves 5, and the member 2 can then be rotated 90 degrees, to dispose same within the member 1 in the position shown in FIGS. 5 and 6. At this time, the equatorial bore 7 of the member 2 registers with the opening 3 in the member 1, and the surface 8 of the member 2 will engage surface 4 of the member 1. Since the surface 8 of the member 2 is of greater diameter than that of the ends of the opening 3 in the member 1, the member 2 cannot be pulled or pushed outwardly from the member 1 by forces applied axially or diametrically in any direction. However, the member 2 is free to turn in the member 1 to a maximum extent determined by the size of the opening 3 as shown in FIG. 6 to dispose the bore 7 for receiving a shaft or rod 10.

Due to the fact that the grooves are provided in only one end of the member 1, there is no exposure of the peripheral area of the member 2 or of the ribs of the member 2 at the other end of the bearing, so that entry of dust, dirt and other foreign matter is eliminated. Moreover, since the grooves at the one end of the member 1 are narrow and closely spaced, the exposed area of the surface 8 at this end of the bearing is reduced to a minimum, thereby further preventing access of dust, dirt and foreign matter to the coacting bearing surfaces. In other words, the areas of overall coacting bearing surfaces is increased to a maximum, and the efficiency of operation of the bearing is greatly improved.

It is also obvious that the parts of the present bearing can be assembled much more easily than can the parts of the bearing disclosed in the aforesaid Reese patent.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention I claim:

1. A universal bearing comprising an outer member having an opening bounded by a spheroidal surface, and having at diametrically-opposite sides of said opening sets of spaced parallel grooves which extend from one end face of said member to the equatorial plane of said member and diminish in depth from a maximum at said end face to zero at said equatorial plane, the bottoms of said grooves lying on a cylinder which passes through the intersection of said spheroidal surface with said equatorial plane, and an inner member having an equatorial bore and a spheroidal surface which is complemental to and engageable with the spheroidal surface of the outer member, said inner member provided at diametrically-opposite sides of its spheroidal surface with sets of parallel ribs, spaced to correspond with the spacing of said grooves, and lying in planes parallel with the general plane of said inner member and adapted for entry into said grooves, when said inner and outer member are assembled.

2. A universal bearing, as defined in claim 1, in which said ribs extend equidistantly in opposite directions from a diametrical plane passing through the centers of said ribs.

3. A universal bearing, as defined in claim 2, in which the maximum depth of each rib coincides with the maximum depth of the groove through which it passes.

4. A universal bearing, as defined in claim 3, in which said inner member can be assembled with said outer member by entry of the inner member into only one end of said outer member.

References Cited in the file of this patent

UNITED STATES PATENTS 2,654,643     Reese _____ Oct. 6, 1953